United States Patent
Yang et al.

(10) Patent No.: US 6,204,602 B1
(45) Date of Patent: Mar. 20, 2001

(54) COMPACT FLUORESCENT LAMP AND BALLAST ASSEMBLY WITH AN AIR GAP FOR THERMAL ISOLATION

(75) Inventors: Kevin J. Yang, Chula Vista, CA (US); Gang Wang, Shanghai (CN); Zheng Zhi Zhao, Shanghai (CN); Xin Li Xu, Shanghai (CN)

(73) Assignee: MagneTek, Inc., Nashville, TN (US)

( * ) Notice: Subject to any disclaimer, the term of this patent is extended or adjusted under 35 U.S.C. 154(b) by 0 days.

(21) Appl. No.: 09/312,973

(22) Filed: May 17, 1999

(51) Int. Cl.$^7$ .................................................. H01J 7/44
(52) U.S. Cl. .......................... 315/58; 315/224; 362/260; 362/294
(58) Field of Search ..................... 315/56, 57, 58, 315/50, 32, 33, 224; 362/373, 294, 265, 264, 260, 267, 221; 313/47, 27, 493, 634

(56) References Cited

U.S. PATENT DOCUMENTS

| | | | |
|---|---|---|---|
| 4,490,649 | 12/1984 | Wang | 315/50 |
| 5,424,610 | * 6/1995 | Pelton et al. | 315/58 |
| 5,629,581 | * 5/1997 | Belle et al. | 313/318.12 |
| 5,686,799 | 11/1997 | Moisin et al. | 315/307 |
| 5,691,598 | 11/1997 | Belle et al. | 313/493 |
| 5,703,440 | 12/1997 | Kachmarik et al. | 315/56 |
| 5,720,548 | * 2/1998 | Geary | 362/260 |
| 5,839,822 | * 11/1998 | Oechsle | 362/264 |

FOREIGN PATENT DOCUMENTS

| | | |
|---|---|---|
| 66855 | 12/1982 | (EP) . |
| 778609 | 6/1997 | (EP) . |

\* cited by examiner

*Primary Examiner*—Don Wong
*Assistant Examiner*—Ephrem Alemu
(74) *Attorney, Agent, or Firm*—Waddey & Patterson; Mark J. Patterson

(57) ABSTRACT

A fluorescent lamp and ballast assembly is designed to thermally isolate a ballast circuit from the illuminated lamp and thereby reduce the heat surrounding the ballast circuit. The fluorescent lamp of the assembly is attached to a housing that reduces the heat transferred to the ballast circuit. The housing includes a bowl-shaped member, a shield, and a thermal isolation member connected between the bowl-shaped member and the shield. The bowl-shaped member is designed to hold and encircle the electronic ballast circuit, and the shield is designed to engage and secure the fluorescent lamp and attached cathode lead wires of the invention. The thermal isolation member is connected between the bowl-shaped member and the shield, and provides an air gap between the lamp and the ballast circuit. The air gap allows ventilation between the lamp and the ballast circuit and also provides a greater distance between the lamp and the ballast circuit to protect the ballast circuit from the heat generated by the energized lamp.

14 Claims, 4 Drawing Sheets

COMPACT FLUORESCENT LAMP AND BALLAST ASSEMBLY WITH AN AIR GAP FOR THERMAL ISOLATION

BACKGROUND OF THE INVENTION

The present invention relates generally to electronic ballasts for fluorescent lamps. More particularly, this invention pertains to a compact fluorescent lamp and ballast assembly that provides a ballast housing having an air gap for isolating a ballast circuit from the heat generated by an energized lamp.

Several patents describe a compact ballast design having a heat shield for reducing the heat received by a ballast circuit from the attached lamp. For example, U.S. Pat. No. 5,691,598 issued to Belle, et al., describes a device that provides a thermal heat shield between the lamp tubes and the ballast circuitry. The thermal heat shield is positioned inside the ballast casing to attempt to reduce the temperature present around the ballast circuitry. Similarly, U.S. Pat. No. 4,490,649 issued to Wang describes a ballast having thermal baffle contained in a gas-tight envelope and positioned close to the miniature arc tube of the lamp to reduce the ballast temperature. Neither of these designs, however, describes the usage of an air gap between the lamp and the ballast to allow ventilation between the ballast and the lamp and to thermally isolate the ballast circuit from the heat generated by the lamp.

European Patent Application No. 66,855 A2 designed by Takteto describes a compact ballast having a housing that includes a partition plate to thermally isolate the ballast and a series of air ducts on the sides of the ballast housing for circulating the outside air with the air contained inside the housing. The fluorescent lamp is in contact with outside air to thereby protect the ballast circuit. This design further includes a partition plate and several vents surrounding the bowl to reduce the temperature inside the housing. Although this design provides a vent for the heat within the bowl member such that the ballast circuit is not overheated, it does not provide an air gap between the fluorescent lamp and the ballast circuit. Consequently, this design does not isolate the ballast circuit from the heat generated by the fluorescent lamp.

What is needed, then, and not found in the prior art, is a compact ballast that provides an air gap between the ballast housing and the fluorescent lamp to isolate the ballast circuit from the heat generated by the fluorescent lamp.

SUMMARY OF THE INVENTION

The present invention is a design for a compact fluorescent ballast having a housing for an electronic ballast circuit that includes an air gap to thermally isolate the ballast circuit from the fluorescent lamp. The housing includes a bowl-shaped member, a shield, and a thermal isolation member connected between the bowl-shaped member and the shield. The bowl-shaped member is designed to hold and encircle the electronic ballast circuit and to provide a connection to a power supply. The shield is designed to engage and secure the ends of the fluorescent lamp and two pairs of cathode lead wires that are attached to the ends of the fluorescent lamp. The cathode lead wires are used to connect the fluorescent lamp to the ballast circuit through the thermal isolation member. The thermal isolation member connects the bowl-shaped member to the shield, while providing an air gap between the lamp and the ballast circuit to isolate the ballast circuit from the heat generated by the lamp while energized.

The thermal isolation member includes a first and a second disc that are joined by a pair of connecting arms. The distance between the first and second discs thereby defines the air gap between the bowl-shaped member and the shield. Furthermore, the arms connecting the first and second discs are designed such that the cathode lead wires attached to the lamps can pass through the connecting arms (and thereby the thermal isolation member) to connect the fluorescent lamp with the ballast circuit housed in the bowl-shaped member.

Consequently, this design provides an air gap between the ballast circuit and the fluorescent lamp to isolate the ballast circuit from the heat transmitted by the illuminated lamp. Accordingly, this thermal isolation lowers the temperature surrounding the ballast circuit to extend the time that the ballast circuit can operate before failure.

It is an object of this invention, therefore, to provide an efficient and inexpensive means of thermally isolating a ballast circuit in a compact ballast to reduce the heat surrounding the ballast circuit and thereby extend the time of that the ballast circuit can properly operate.

BRIEF DESCRIPTION OF THE DRAWINGS

FIG. 6b is cross-sectional view of the thermal isolation member taken along the lines A—A of FIG. 6a.

DESCRIPTION OF THE PREFERRED EMBODIMENTS

Figures 1, 2:
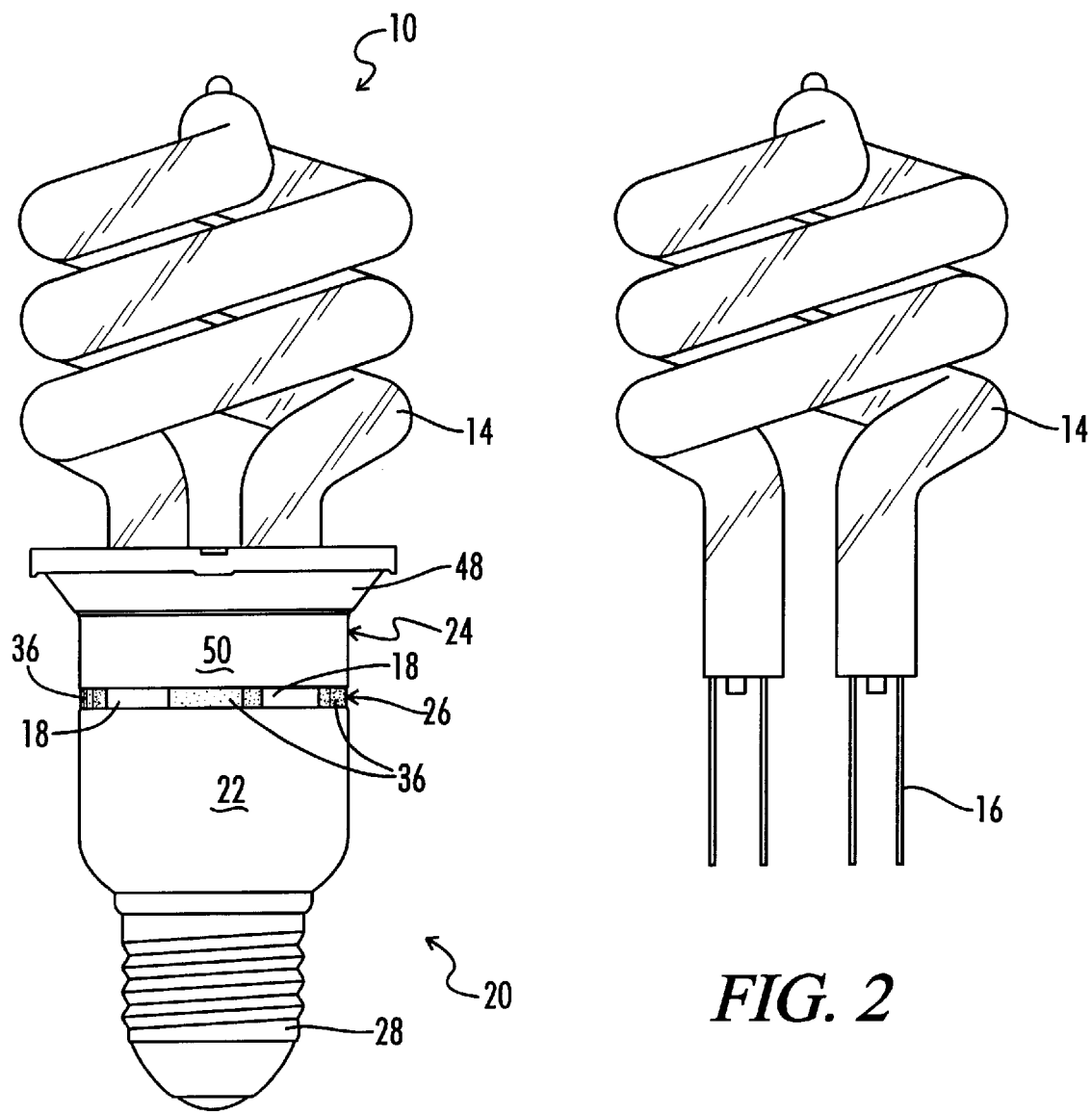
FIG. 1 is a plan view of the side of the electronic lighting ballast assembly.
FIG. 2 is a plan view of the side of the lamp tube and cathode lead wire used in the lighting ballast assembly as shown in FIG. 1.
Figure 4:
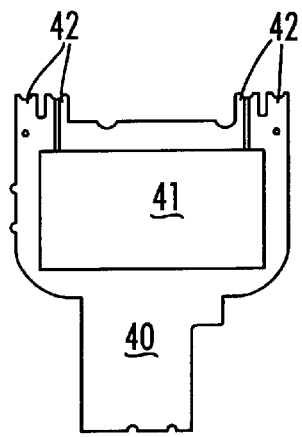
FIG. 4 is a plan view of the side of the printed circuit board, with the ballast circuit attached to the printed circuit board shown as a block diagram.

Looking at FIG. 1, the fluorescent lamp and ballast assembly 10 is shown. The assembly 10 includes a housing 20 for a ballast circuit (not shown in FIG. 1) and a fluorescent lamp 14. The fluorescent lamp 14 is further shown in FIG. 2 with two pairs of cathode lead wires 16 attached to each end of the fluorescent lamp 14. The housing 20 includes three elements: a bowl-shaped member 22, a shield 24, and a thermal isolation member 26. The bowl-shaped member 22 is designed to contain the ballast circuit 41 that is mounted on a printed circuit board 40 ("PCB") (see FIG. 4) and to provide a connection to a power supply (not shown). The shield 24 is designed to engage the fluorescent lamp 14 to aid in deflecting heat generated by the fluorescent lamp 14 so as to reduce the heat that reaches the ballast circuit. The thermal isolation member 26 is connected between the bowl-shaped member 22 and the shield 24.

The assembly 10 as shown in FIG. 1 is designed to thermally isolate the ballast circuit 41 contained in the bowl-shaped member 22 from the heat generated by the fluorescent lamp 14. As will be described in greater detail later, the thermal isolation member 26 has an air gap 18 of approximately three millimeters that provides ventilation between the ballast circuit 41 and the fluorescent lamp 14 and that isolates the ballast circuit 41 contained in the bowl-shaped member 22 from the heat produced by the fluorescent lamp 14.

Figure 3B:
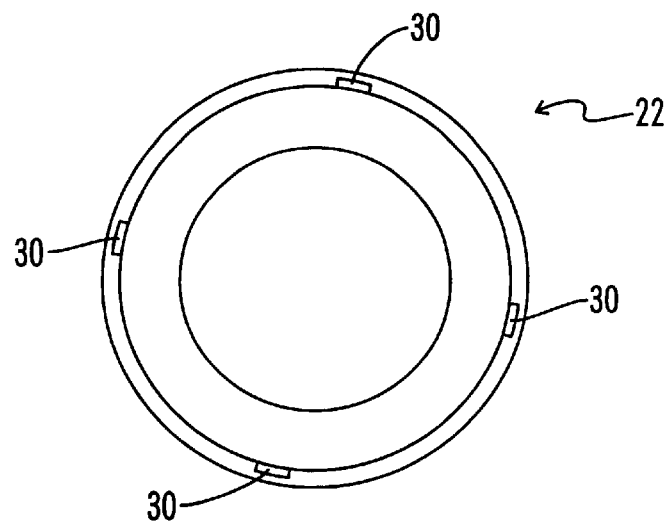
FIG. 3b is a plan view of the top of the bowl-shaped member of the ballast housing.
Figure 3A:
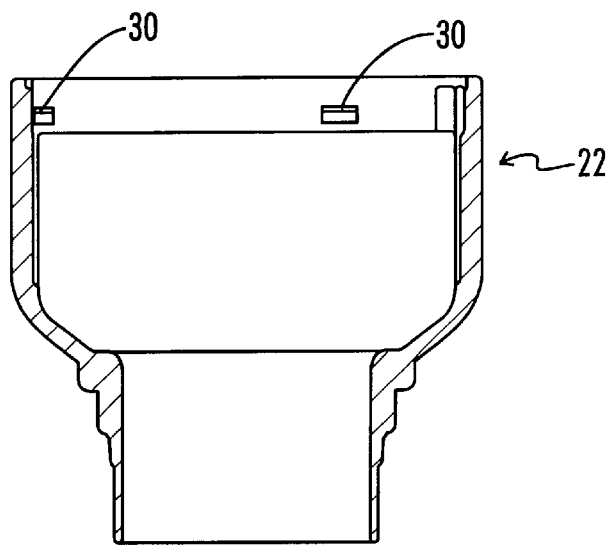
FIG. 3a is a cross-sectional side view of the bowl-shaped member of the ballast housing.

FIG. 3a is a cross-sectional side view the bowl-shaped member 22 of the present invention. The bowl-shaped member 22 is designed such that a PCB 40 can be mounted within the bowl-shaped member 22, with the ballast circuit 41 mounted upon the PCB 40 (see FIG. 4). The bowl-shaped member 22 further includes a standard screw base member 28 to connect the assembly 10 to a conventional incandescent lamp socket (not shown) to receive power. The ballast circuit 41 is electrically connected to the screw base member 28. FIG. 3b shows a top view of the bowl-shaped member 22. Looking at FIGS. 3a and 3b, a set of locking grooves 30 is illustrated near the top of the bowl-shaped member 22. The locking grooves 30 interact with the thermal isolation member 26 (discussed in greater detail below) to secure the thermal isolation member 26 to the bowl-shaped member 22.

Figure 5A:
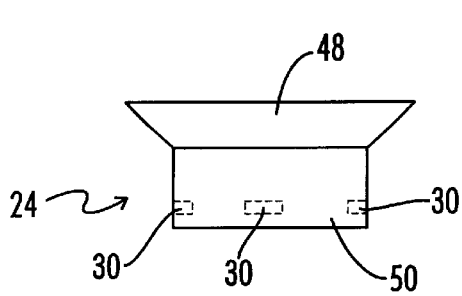
FIG. 5a is a plan view of the side of shield of the ballast housing.
Figure 5B:
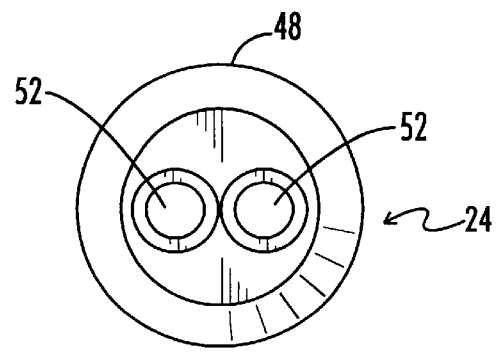
FIG. 5b is a plan view of the top of the shield of the ballast housing.

FIG. 5a illustrates a side view of the shield 24 used in the present invention, and FIG. 5b illustrates a top view. Looking at FIG. 5a, the shield 24 includes a cylindrical base member 50 and a shield flange 48 that is angled outward from the top of the cylindrical base member 50. Looking at FIG. 5b, the shield 24 additionally has two lamp engaging holes 52 to engage the two ends of the fluorescent lamp 14 (as shown in FIG. 2). The fluorescent lamp 14 will thereby engage the shield 14 on the same side as the shield flange 48. Additionally, the cylindrical base member 50 includes a set of locking grooves 30 (see FIG. 5a). The locking grooves 30 are used to secure the shield 24 with the thermal isolation member 26.

The extension of the shield flange 48 away from the cylindrical base member 50 is such that the shield flange 48 further aids in deflecting the heat emitted from the illuminated lamp 14. By blocking this heat from the bowl-shaped member 22, the shield flange 48 further aids in isolating the ballast circuit 41 in the bowl-shaped member 22 from the destructive heat produced by the fluorescent lamp 14.

Figure 6C:
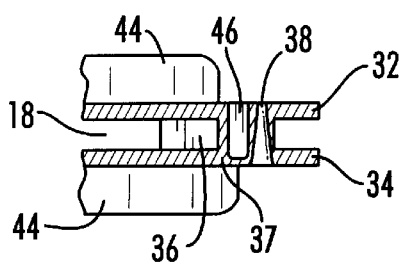
FIG. 6c is cross-sectional view of the thermal isolation member taken along the lines B—B of FIG. 6b.
Figure 6B:
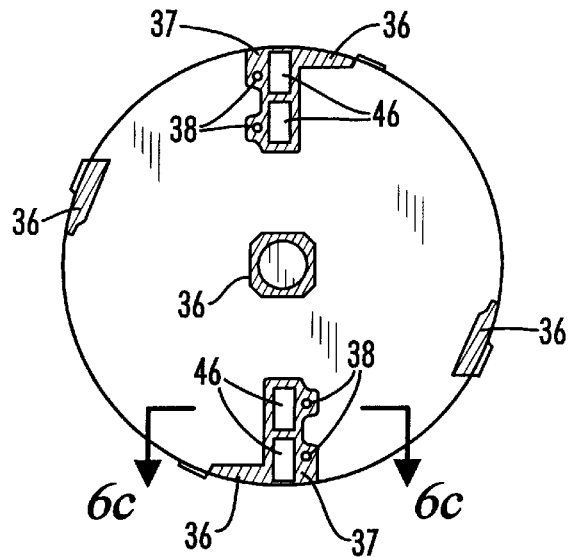
Figure 6A:
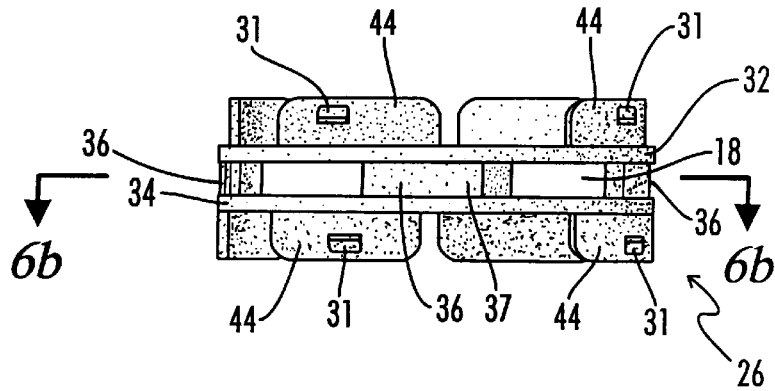
FIG. 6a is a plan view of the side of the thermal isolation member.

FIGS. 6 and 7 illustrate the thermal isolation member 26 which connects with the bowl-shaped member 22 and with the shield 24, and provides an air gap 18 between the two elements to protect the ballast circuit 41. Looking at FIG. 6a, a side view of the thermal isolation member 26 is shown. The thermal isolation member 26 includes a first disc 32 and a second disc 34 that may be molded out of one piece of polycarbonate plastic or a similar material. The first disc 32 is attached to the second disc 34 by a pair of attachment arms 36. Each disc 32, 34 of the thermal isolation member 26 includes a plurality of connecting tabs 44 that have locking projections 31 attached. The locking projections 31 of the connecting tabs 44 of the first disc 32 are used to engage the locking groves 30 of the shield 24 to securely connect the thermal isolation member 26 with the shield 24. The locking projections 31 of the connecting tabs 44 of the second disc 34 are used to engage the locking groves 30 of the bowl-shaped member 22 to securely connect the thermal isolation member 26 with the bowl-shaped member 22.

Looking at FIG. 6b, the cross-sectional view taken along the lines A—A of FIG. 6a illustrates the location of the attachment arms 36 that join the first and second disc 32, 34. To provide stability between the first and second discs 32, 34, a set of attachment arms 36 are used to connect the two discs 32, 34. From this set of attachment arms 36, two lead attachment arms 37 are designed to each surround a pair of cathode lead wire holes 38 that allow the cathode lead wires 16 to pass through the thermal isolation member 26. The cathode lead wires 16 are thereby able to connect to the PCB 40. Looking at FIG. 6c, the cross-sectional view taken along lines B—B of FIG. 6b further shows a division of the attachment arms 36 and first and second discs 32, 34.

Figure 7A:
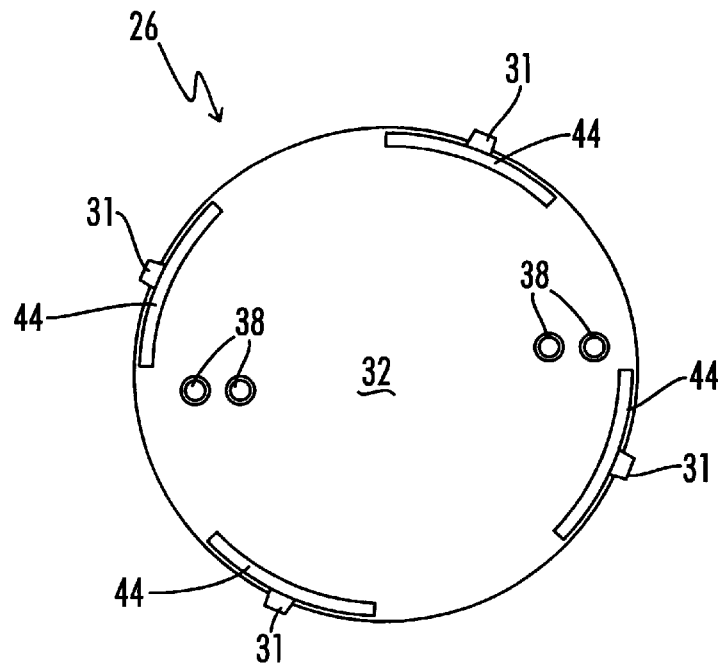
FIG. 7a is a plan view of the top of the first disc of the thermal isolation member.

FIG. 7a is an illustration of the top view of the thermal isolation member 26. The connecting tabs 44 are shown to extend up from the first disc 32. The pair of cathode lead wire holes 38 are further provided to allow the cathode lead wires 16 to travel through the thermal isolation member 26 to engage the ballast circuit 41.

Figure 7B:
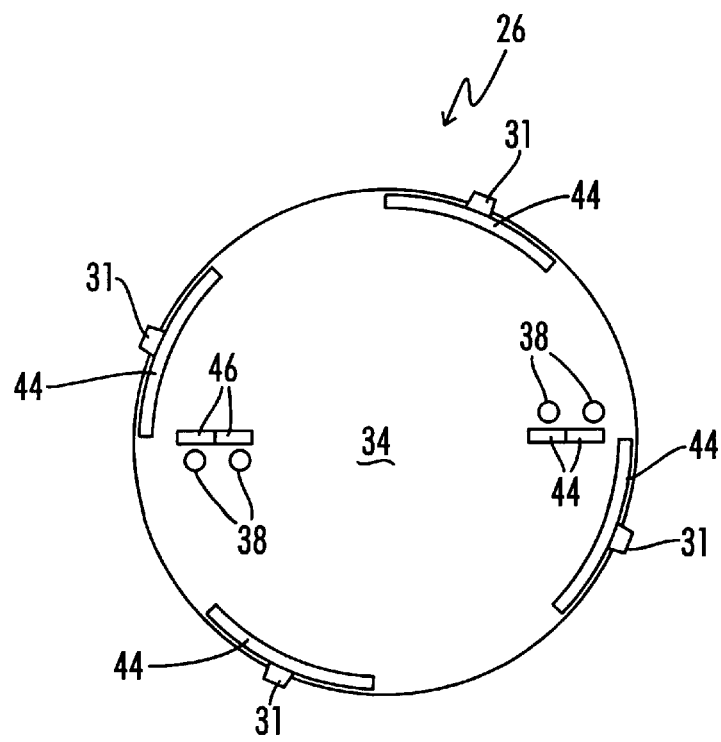
FIG. 7b is a plan view of the bottom view of the second disc of the thermal isolation member.

FIG. 7b is a view of the bottom of the second disc 34 of the thermal isolation member 26. The electrical connection between the fluorescent lamp 14 and the ballast circuit 41 is made through the second disc 34. FIG. 7b shows a pair of receiving slots 46 that are designed to engage a pair of PCB connecting arms 42 shown in FIG. 4. To make the electrical connection between the ballast circuit 41 and the fluorescent lamp 14, the cathode lead wires 16 are inserted into the receiving slots 46. The PCB arms 42 (which are electrically connected to the ballast circuit 41) can then be inserted into the receiving slots 46 to make an electrical connection between the cathode lead wires 16 and the ballast circuit 41.

In operation, the air gap 18 thereby provides isolation between the lamps 14 and the ballast circuit 41. This reduces the heat inside the bowl-shaped member 22 in several ways. First, air is allowed to circulate between the shield 24 and the bowl-shaped assembly 22 to reduce the temperature surrounding the bowl-shaped member 22. Additionally, the air gap 18 increases the separation distance between the ballast circuit 41 and the fluorescent lamp 14 to reduce the heat received through the bowl-shaped member 22. Experimental tests have consequently shown that this design will reduce the temperature around the ballast circuit 41 within the bowl-shaped member 22 by up to 15° Celsius. As a result of this drop in temperature, the ballast circuit 41 is able to operate for a longer period of time without failure.

Thus, although there have been described particular embodiments of the present invention of a new and useful Compact Fluorescent Lamp and Ballast Assembly with an Air Gap for Thermal Isolation, it is not intended that such references be construed as limitations upon the scope of this invention except as set forth in the following claims.

What is claimed is:

1. A housing for an electronic ballast circuit and a fluorescent lamp comprising:
   a bowl-shaped member surrounding the ballast circuit;
   a shield engaging the fluorescent lamp; and
   a thermal isolation member connected between said bowl-shaped member and said shield, said thermal isolation member defining an air gap between said bowl-shaped member and said shield, said air gap allowing air outside of the ballast to flow between said bowl-shaped member and said shield.

2. The housing as described claim 1 wherein the thermal isolation member comprises a first disc connected to a second disc by at least one connecting arm, the distance between the first and second disc defining the air gap between the bowl-shaped member and the shield.

3. The housing as described in claim 2 wherein the thermal isolation member further comprises
   a first pair of connecting tabs attached to the first disc to join the thermal isolation member with the shield; and
   a second pair of connecting tabs attached to the second disc to join the thermal isolation member to the bowl-shaped member.

4. The housing as described in claim 1 wherein the shield comprises
   a cylindrical base member having a first and second end; and
   a flange attached to the first end of the cylindrical base member;
   wherein the second end of the cylindrical base member is connected to the thermal isolation member.

5. A compact lighting ballast comprising:
   a ballast circuit adaptable to be electrically connected to a power supply means;
   a housing for said ballast circuit including
      a bowl-shaped member surrounding said ballast circuit;
      a shield; and
   a thermal isolation member connected between said bowl-shaped member and said shield, said thermal isolation member defining an air gap between said bowl-shaped member and said shield, said air gap allowing air outside of the ballast to flow between said bowl-shaped member and said shield.

6. The compact lighting ballast as described claim 5 wherein the thermal isolation member comprises a first disc connected to a second disc by at least one arm, the distance between the first and second disc defining the air gap between the bowl-shaped member and the shield.

7. The compact lighting ballast as described in claim 6 wherein the thermal isolation member further comprises
   a first pair of connecting tabs attached to the first disc to join the thermal isolation member to the shield; and
   a second pair of connecting tabs attached to the second disc to join the thermal isolation member to the bowl-shaped member.

8. The compact lighting ballast as described in claim 5 wherein the shield comprises
   a cylindrical base member having a first and second end; and
   a flange attached to the first end of the cylindrical base member;
   wherein the second end of the cylindrical base member is connected to the thermal isolation member.

9. A fluorescent lamp and ballast assembly comprising:
   an electronic ballast circuit;
   a lamp tube having a first and second end, said first and second ends of the lamp tube electrically connected to said electronic ballast circuit;
   a housing for said ballast circuit, said housing including
      a bowl-shaped member surrounding said ballast circuit;
      a shield engaging said lamp tube; and
   a thermal isolation member connected between said bowl-shaped member and said shield, said thermal isolation member defining an air gap between said bowl-shaped member and said shield, said air allowing air outside of the ballast to flow between said bowl-shaped member and said shield.

10. The assembly of claim 9 wherein the thermal isolation member comprises a first disc connected to a second disc by a first and second attachment arm, the distance between the first and second discs defining the air gap.

11. The assembly of claim 10 wherein the thermal isolation member further comprises
    a first pair of connecting tabs attached to the first disc to join the thermal isolation member to the shield; and
    a second pair of connecting tabs attached to the second disc to join the thermal isolation member to the bowl-shaped member.

12. The assembly of claim 10 further comprising
    a first cathode lead wire connected to the first end of the lamp tube; and
    a second cathode lead wire connected to the second end of the lamp tube;
    wherein the first cathode lead wire is connected to the ballast circuit through the first attachment arm and the second cathode lead wire is connected to the ballast circuit through the second attachment arm.

13. The assembly of claim 9 further comprising a screw base attached to the bowl-shaped member for connected to the ballast circuit, the screw base adapted to connect the ballast circuit to an external power supply.

14. The assembly of claim 9 wherein the shield comprises:
    a cylindrical base member having a first and second end; and
    a flange attached to the first end of the cylindrical base member;
    wherein the second end of the cylindrical base member is connected to the thermal isolation member.

* * * * *